US012560090B2

(12) United States Patent
Rondeau et al.

(10) Patent No.: US 12,560,090 B2
(45) Date of Patent: Feb. 24, 2026

(54) METHODS OF SEMI-PERMANENTLY ATTACHING COMPONENTS ON A WIND TURBINE ROTOR BLADE

(71) Applicant: LM Wind Power A/S, Kolding (DK)

(72) Inventors: Louis Rondeau, Greenville, SC (US); Scott Iverson Shillig, Greenville, SC (US); Andrew Ross Collier, Greenville, SC (US); Salim Abdallah El-Naaman, Roskilde (DK); Naresh Reddy Kolanu, Bangalore (IN)

(73) Assignee: LM Wind Power A/S, Kolding (DK)

( * ) Notice: Subject to any disclaimer, the term of this patent is extended or adjusted under 35 U.S.C. 154(b) by 0 days.

(21) Appl. No.: 18/683,579

(22) PCT Filed: Aug. 16, 2021

(86) PCT No.: PCT/US2021/046107
§ 371 (c)(1),
(2) Date: Feb. 14, 2024

(87) PCT Pub. No.: WO2023/022702
PCT Pub. Date: Feb. 23, 2023

(65) Prior Publication Data
US 2024/0352859 A1 Oct. 24, 2024

(51) Int. Cl.
*F01D 5/14* (2006.01)
*F03D 1/06* (2006.01)

(52) U.S. Cl.
CPC .......... *F01D 5/147* (2013.01); *F05B 2230/60* (2013.01); *F05B 2240/302* (2013.01)

(58) Field of Classification Search
CPC .... F03D 1/0675; F03D 1/0641; F03D 1/0633; F03D 1/0677; F05B 2240/302;
(Continued)

(56) References Cited

U.S. PATENT DOCUMENTS 5,077,870 A 1/1992 Melbye et al.
6,000,106 A 12/1999 Kampfer et al.
(Continued)

FOREIGN PATENT DOCUMENTS

CN 203322260 U 12/2013
CN 104787301 A 7/2015
(Continued)

OTHER PUBLICATIONS

PCT International Search Report & Opinion Corresponding to PCTUS2021046107 on May 13, 2022.

*Primary Examiner* — Eric J Zamora Alvarez
(74) *Attorney, Agent, or Firm* — Dority & Manning, P.A.

(57) ABSTRACT

A rotor blade assembly of a wind turbine includes a first blade component and a second blade component arranged together at an interface. The interface includes a gap between the blade components. The rotor blade assembly also includes a re-closeable fastening assembly having first and second fastening members. The first fastening member is arranged with a surface of the first blade component or the second blade component. The rotor blade assembly further includes a flexible sealing member arranged so as to cover the gap. The second fastening member is arranged with a surface of the flexible sealing member to align with the first fastening member on the surface of the first blade component or the second blade component. Thus, the flexible sealing member is secured at the interface to each of the first and second blade components via the first and second fastening members.

11 Claims, 15 Drawing Sheets

(58) Field of Classification Search
CPC ............ F05B 2230/60; F05B 2240/301; F05B 2240/57; F05B 2280/4007; F05B 2230/23; F05B 2230/604; F05B 2250/61; F05B 2260/30; F05B 2230/50; F05B 2230/70; F05B 2240/30; F05B 2240/31; F05B 2240/311; F05B 2250/611; F05B 2280/6013; F05B 2280/6003; B29D 99/0028; F01D 5/147; Y02E 10/72
See application file for complete search history.

(56) References Cited

U.S. PATENT DOCUMENTS

| | | | |
|---|---|---|---|
| 6,039,911 A | 3/2000 | Miller et al. | |
| 6,410,099 B1 | 6/2002 | Loncar, Jr. | |
| 6,721,999 B2 | 4/2004 | Meager | |
| 7,018,496 B1 | 3/2006 | George et al. | |
| 8,136,329 B2 | 3/2012 | Willis | |
| 8,206,107 B2 | 6/2012 | Dawson et al. | |
| 9,086,054 B2 * | 7/2015 | Loh | F03D 7/0232 |
| 9,156,559 B2 | 10/2015 | Grip et al. | |
| 9,617,973 B2 * | 4/2017 | Stege | F03D 1/0675 |
| 9,719,487 B2 | 8/2017 | Bech et al. | |
| 10,760,544 B2 | 9/2020 | Yarbrough et al. | |
| 10,794,359 B2 | 10/2020 | Merzhaeuser et al. | |
| 11,486,351 B2 | 11/2022 | Avaldi et al. | |
| 11,555,483 B2 | 1/2023 | Avaldi et al. | |
| 2002/0162197 A1 | 11/2002 | Romanko et al. | |
| 2003/0126724 A1 * | 7/2003 | Kono | A44B 18/0092 24/451 |
| 2011/0052403 A1 | 3/2011 | Kawasetsu et al. | |
| 2012/0321376 A1 | 12/2012 | Walters | |
| 2018/0238300 A1 | 8/2018 | Shain et al. | |
| 2020/0355157 A1 | 11/2020 | Spieth | |
| 2023/0108542 A1 | 4/2023 | Vogel et al. | |

FOREIGN PATENT DOCUMENTS

| | | | |
|---|---|---|---|
| CN | 205841106 | U | 12/2016 |
| CN | 105697232 | B | 3/2019 |
| EP | 1372424 | A2 | 1/2004 |
| EP | 2749765 | A1 | 7/2014 |
| EP | 3139032 | A1 | 3/2017 |
| EP | 3144526 | A1 | 3/2017 |
| EP | 2526288 | B1 | 6/2017 |
| EP | 3025053 | B1 | 9/2017 |
| EP | 3236096 | A1 | 10/2017 |
| EP | 3642477 | A1 | 4/2020 |
| GB | 2473448 | A | 3/2011 |
| JP | 3221624 | B2 | 10/2001 |
| JP | 2003250609 | A | 9/2003 |
| JP | 2006123277 | A | 5/2006 |
| WO | WO0146582 | A2 | 6/2001 |
| WO | WO2012/003834 | A2 | 1/2012 |
| WO | WO2012/113400 | A2 | 8/2012 |
| WO | WO2012113399 | A2 | 8/2012 |
| WO | WO2015/185066 | A1 | 12/2015 |
| WO | WO2017/071717 | A1 | 5/2017 |
| WO | WO2020/089069 | A1 | 5/2020 |
| WO | WO2021/076097 | A1 | 4/2021 |
| WO | WO2020/089064 | A1 | 1/2023 |

* cited by examiner

METHODS OF SEMI-PERMANENTLY ATTACHING COMPONENTS ON A WIND TURBINE ROTOR BLADE

RELATED APPLICATION

The present application claims priority to PCT Application Number PCT/US2021/046107, filed Aug. 16, 2021, is incorporated by reference herein in its entirety.

FIELD

The present disclosure relates generally to wind turbines, and more particularly to methods of semi-permanently attaching components on a wind turbine rotor blade.

BACKGROUND

Wind power is considered one of the cleanest, most environmentally friendly energy sources presently available, and wind turbines have gained increased attention in this regard. A modern wind turbine typically includes a tower, a generator, a gearbox, a nacelle, and a rotor having a rotatable hub with one or more rotor blades. The rotor blades capture kinetic energy of wind using known airfoil principles. The rotor blades transmit the kinetic energy in the form of rotational energy so as to turn a shaft coupling the rotor blades to a gearbox, or if a gearbox is not used, directly to the generator. The generator then converts the mechanical energy to electrical energy that may be deployed to a utility grid.

The rotor blades generally include a suction side shell and a pressure side shell typically formed using molding processes that are bonded together at bond lines along the leading and trailing edges of the blade. Further, the pressure and suction shells are relatively lightweight and have structural properties (e.g., stiffness, buckling resistance and strength) which are not configured to withstand the bending moments and other loads exerted on the rotor blade during operation. Thus, to increase the stiffness, buckling resistance, and strength of the rotor blade, the body shell is typically reinforced using one or more structural components (e.g., opposing spar caps with a shear web configured therebetween) that engage the inner pressure and suction side surfaces of the shell halves. The spar caps and/or shear web may be constructed of various materials, including but not limited to glass fiber laminate composites and/or carbon fiber laminate composites. Many rotor blades often also include a leading edge bond cap positioned at the leading edge of the rotor blade between the suction side and pressure side shells.

As wind turbine rotor blades evolve, there is a need to attach components to the blade that can be removed easily to allow inspection and/or repairs. Such attachments need to be strong enough to resist to the different forces applied to the components, including but not limited to, fatigue, peel, shear, creep, flexibility and/or elongation forces.

Accordingly, the present disclosure is directed to methods of semi-permanently attaching components on a wind turbine rotor blade so as to address the aforementioned issues. In particular, the present disclosure includes rotor blade assemblies that utilize a re-closable fastening assembly.

BRIEF DESCRIPTION

Aspects and advantages of the invention will be set forth in part in the following description, or may be obvious from the description, or may be learned through practice of the invention.

In one aspect, the present disclosure is directed to a rotor blade assembly of a wind turbine. The rotor blade assembly includes a first blade component and a second blade component arranged with the first blade component at an interface. The interface includes a gap between the first and second blade components. The rotor blade assembly also includes a re-closeable fastening assembly having, at least, a first fastening member and a corresponding, second fastening member. The first fastening member is arranged with a surface of at least one of the first blade component or the second blade component. The rotor blade assembly further includes a flexible sealing member arranged at the interface so as to cover the gap. Moreover, the second fastening member is arranged with a surface of the flexible sealing member such that the second fastening member aligns with the first fastening member on the surface of at least one of the first blade component or the second blade component. Thus, the flexible sealing member is secured at the interface to each of the first and second blade components via the first and second fastening members.

In an embodiment, the first and second blade components of the rotor blade may be at least one of a rotor blade shell, a spar cap, a leading edge, a trailing edge, or combinations thereof, the rotor blade shell comprising at least one of a pressure side shell or a suction side shell.

In another embodiment, the first and second fastening members may include at least one of hook-and-loop fasteners, snap-fit fasteners, interlocking fasteners, zipper fasteners, or combinations thereof.

For example, in an embodiment, the first and second fastening members may be the interlocking fasteners. In such embodiments, the interlocking fasteners may include at least one of mushroom-shaped fasteners or dovetail-shaped fasteners.

In another embodiment, the first and second fastening members may be the hook-and-loop fasteners. In such embodiments, the first fastening member may be a first hook-and-loop fastening member and the second fastening member may be a second hook-and-loop fastening member, with the first and second hook-and-loop fastening members being secured to exterior surfaces of at least one of the first blade component or the second blade component and a flange of the flexible sealing member.

In additional embodiments, the first and second fastening members may be the zipper fasteners. In such embodiments, the first fastening member may be a first zipper fastening member and the second fastening member may be a second zipper fastening member. More particularly, in an embodiment, the first zipper fastening member may be a groove formed into the surface of at least one of the first blade component or the second blade component and the second zipper fastening member may be a corresponding protrusion formed into a flange of the flexible sealing member, the second zipper fastening member fitting into the first zipper fastening member.

In further embodiments, the rotor blade assembly may include an insert member inserted into the groove atop the second zipper fastening member to secure the first and second zipper fastening members in place.

In several embodiments, the rotor blade assembly may include an elastomer matrix between the insert member and the second zipper fastening member to increase peel strength.

In still another embodiment, the first and second fastening members may be the snap-fit fasteners. In such embodiments, the first fastening member may be a first snap-fit fastening member and the second fastening member may be a second snap-fit fastening member, with the first snap-fit fastening member being a groove formed into the surface of at least one of the first blade component or the second blade component, and the second snap-fit fastening member being a corresponding protrusion formed into a flange of the flexible sealing member. Thus, in such embodiments, the second snap-fit fastening member snap fits into the first snap-fit fastening member.

In particular embodiments, the rotor blade assembly may further include an elastomer matrix provided between the first and second fastening members or adjacent to one of the first and second fastening members for further securing the first and second fastening members together, improving peel strength, and/or preventing fluid ingress.

In additional embodiments, the flexible sealing member may include one or more bellows for providing flexibility thereto such that the flexible sealing member allows for movement between the first and second blade components.

In another aspect, the present disclosure is directed to a method of joining first and second blade components of a rotor blade of a wind turbine. The method includes arranging the first and second blade components together at an interface. The interface includes a gap between the first and second blade components, with each of the first and second blade components including a first fastening member of a re-closeable fastening assembly secured to an exterior surface thereof. The method also includes aligning a flexible sealing member at the interface so as to cover the gap. The flexible sealing member includes corresponding, second fastening members of the fastening assembly that align with the first fastening member on the exterior surfaces of each of the first and second blade components. Further, the method includes securing the flexible sealing member at the interface to each of the first and second blade components by pressing the first and second fastening members of the fastening assembly together. It should be understood that the method may further include any of the additional steps and/or features as described herein.

In yet another aspect, the present disclosure is directed to a rotor blade assembly of a wind turbine. The rotor blade assembly includes a first blade component, a re-closeable fastening assembly having, at least, a first fastening member and a corresponding, second fastening member. The first fastening member is arranged with a surface of the first blade component. The rotor blade assembly also includes an add-on component arranged adjacent to the first fastening member, with the second fastening member being arranged with a surface of the add-on component such that the second fastening member aligns with the first fastening member on the surface of the first blade component. Thus, the add-on component is secured to the first blade component via the first and second fastening members. It should be understood that the rotor blade assembly may further include any of the additional features as described herein.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION

Figure 1:
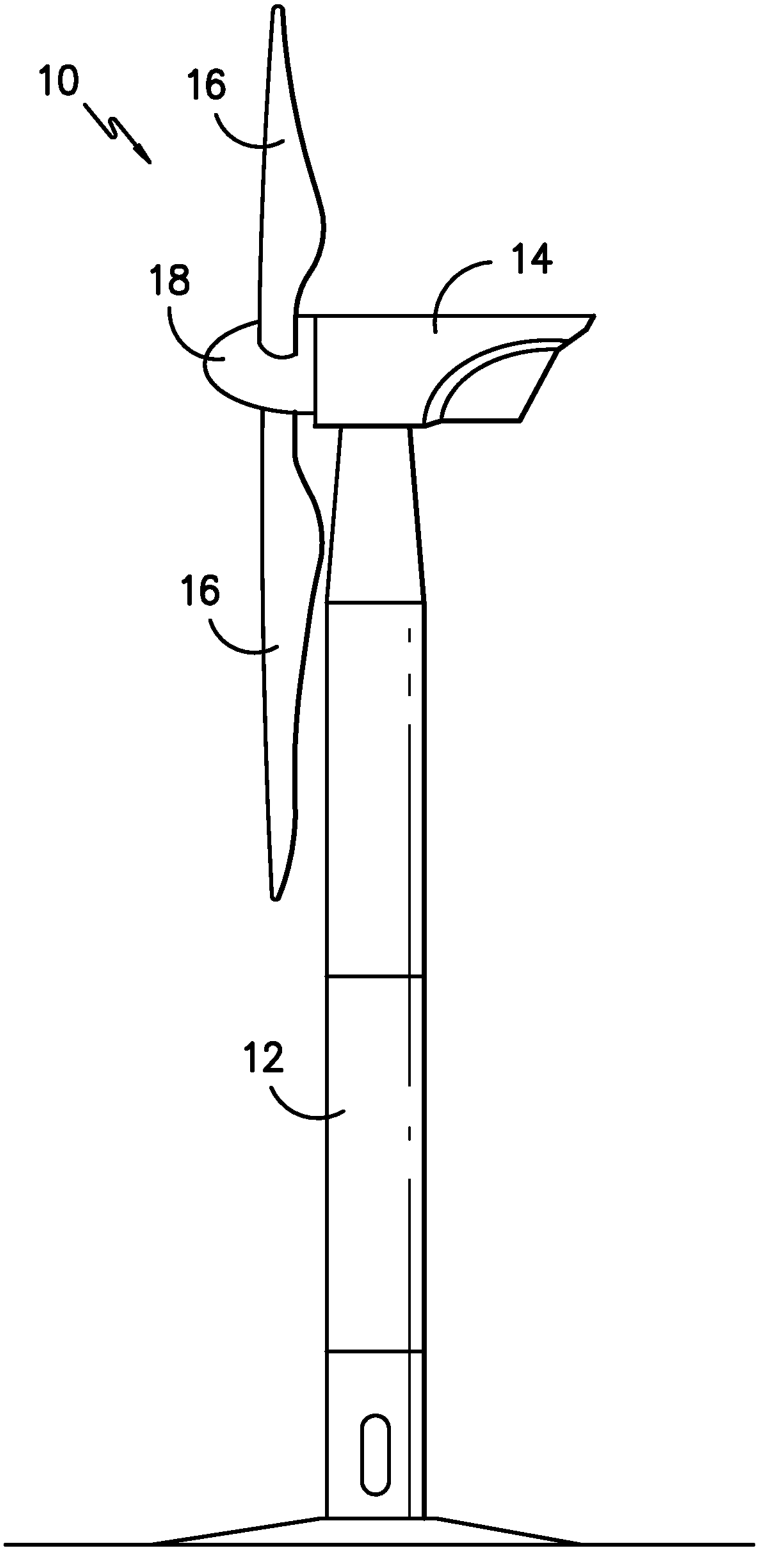
FIG. 1 illustrates a perspective view of one embodiment of a wind turbine according to the present disclosure.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

In general, the present disclosure is directed to a rotor blade assembly of a wind turbine having a first blade component and a second blade component arranged together at an interface. The interface includes a gap between the first and second blade components. The rotor blade assembly also includes a re-closeable fastening assembly arranged at the interface and having, at least, a first fastening member and a corresponding, second fastening member. The first fastening member is arranged with a surface of the first blade component or the second blade component. The rotor blade assembly further includes a flexible sealing member arranged at the interface so as to cover the gap. Moreover, the second fastening member is arranged with a surface of the flexible sealing member such that the second fastening member aligns with the first fastening member on the surface of at least one of the first blade component or the second blade component. Thus, the flexible sealing member may be removably or permanently secured at the interface to each of the first and second blade components via the first and second fastening members.

Such fastening members may include, for example, re-closable snapping fastener systems, including but not limited to, 3M™ Dual Lock™ fasteners, hook and loop fasteners (such as Velcro® strips), zip-lock style closure systems, as well as industrial waterproof zipper fasteners for securing components on a blade. Such components may include, for example, access panels, serrations, vortex generators, spoilers, inspection doors, seals (as described above), sensors, flaps, etc. Using such fastener systems allows for easy removal and replacement of the fasteners multiple times during the life of the rotor blade. Such fastener systems also allow for easy replacement in the field. The re-closable fastener system can also be used if needed in combination with mechanical fasteners preventing the re-closable fastener system to start peeling and adding strength to the system.

Referring now to the drawings, FIG. 1 illustrates one embodiment of a wind turbine 10 according to the present disclosure. As shown, the wind turbine 10 includes a tower 12 with a nacelle 14 mounted thereon. A plurality of rotor blades 16 are mounted to a rotor hub 18, which is in turn connected to a main flange that turns a main rotor shaft. The wind turbine power generation and control components are housed within the nacelle 14. The view of FIG. 1 is provided for illustrative purposes only to place the present invention in an exemplary field of use. It should be appreciated that the invention is not limited to any particular type of wind turbine configuration. In addition, the present invention is not limited to use with wind turbines, but may be utilized in any application using resin materials. Further, the methods described herein may also apply to manufacturing any similar structure that benefits from the resin formulations described herein.

Figure 2:
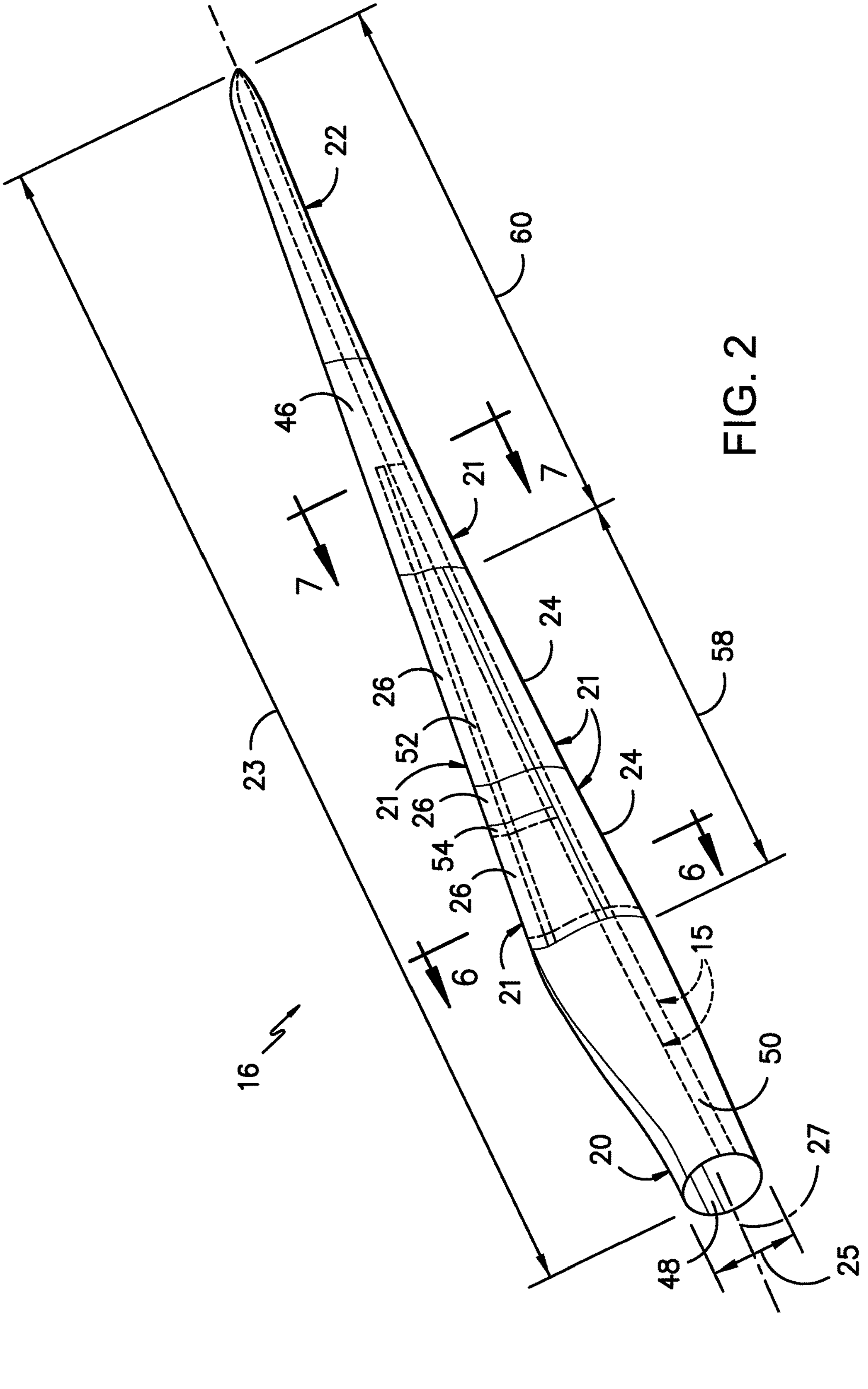
FIG. 2 illustrates a perspective view of one embodiment of a rotor blade of a wind turbine according to the present disclosure.
Figure 3:
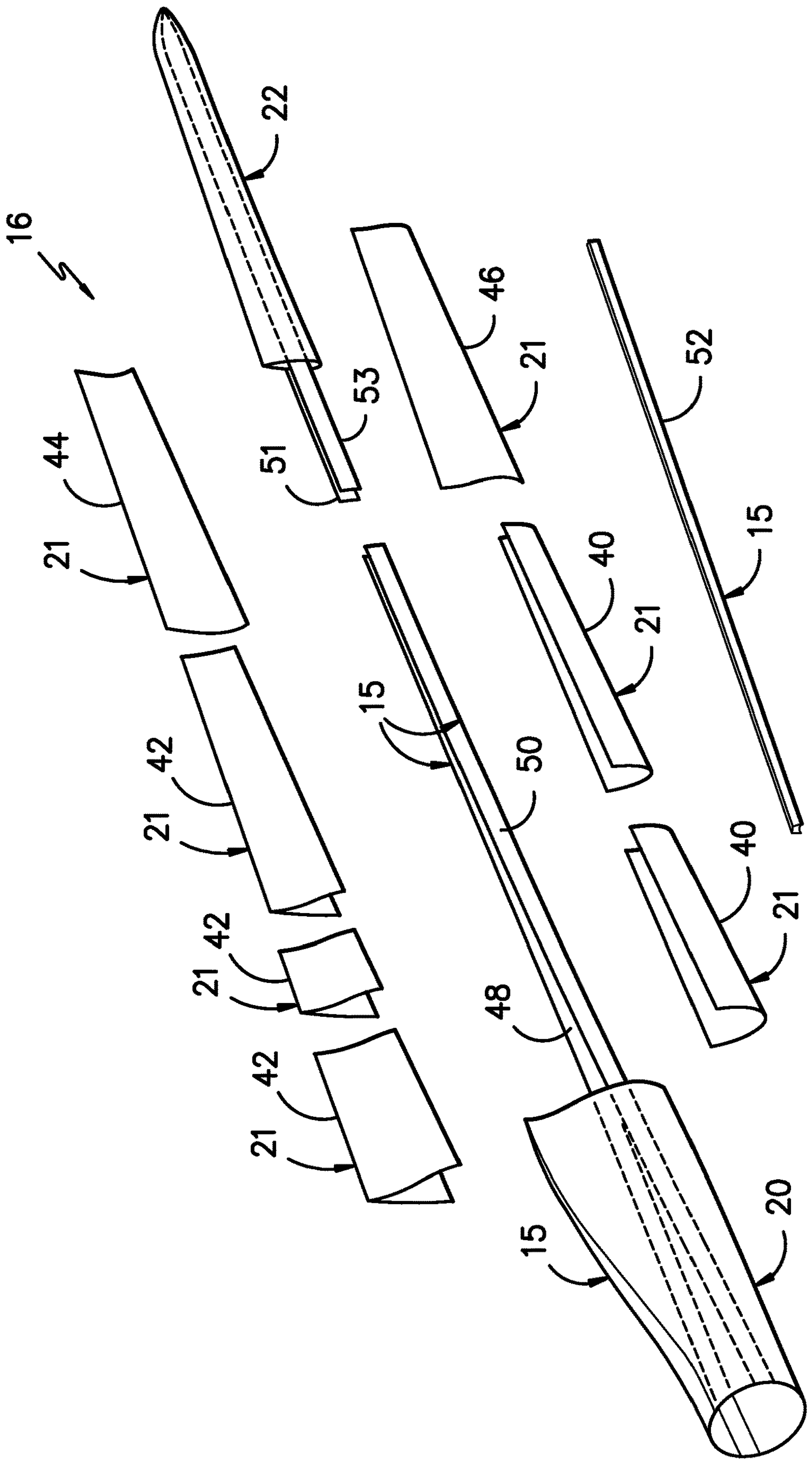
FIG. 3 illustrates an exploded view of the modular rotor blade of FIG. 2.

Referring now to FIGS. 2 and 3, various views of a rotor blade 16 (also referred to herein as a rotor blade assembly) according to the present disclosure are illustrated. As shown, the illustrated rotor blade 16 has a segmented or modular configuration. It should also be understood that the rotor blade 16 may include any other suitable configuration now known or later developed in the art. As shown, the modular rotor blade 16 includes a main blade structure 15 and at least one blade segment 21 secured to the main blade structure 15. More specifically, as shown, the rotor blade 16 includes a plurality of blade segments 21.

Figure 6:
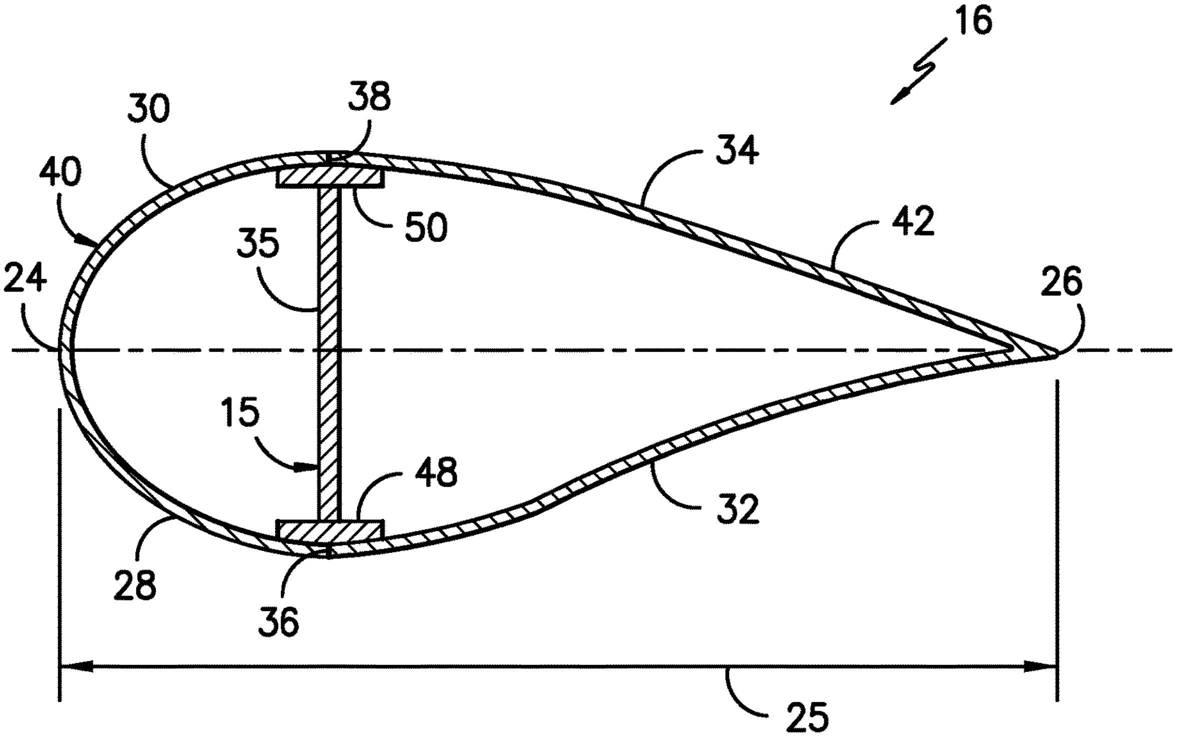
FIG. 6 illustrates a cross-sectional view of the modular rotor blade of FIG. 2 according to the present disclosure.

More specifically, as shown, the main blade structure 15 may include any one of or a combination of the following: a pre-formed blade root section 20, a pre-formed blade tip section 22, one or more one or more continuous spar caps 48, 50, 51, 53, one or more shear webs 35 (FIGS. 6-7), an additional structural component 52 secured to the blade root section 20, and/or any other suitable structural component of the rotor blade 16. Further, the blade root section 20 is configured to be mounted or otherwise secured to the rotor 18 (FIG. 1). In addition, as shown in FIG. 2, the rotor blade 16 defines a span 23 that is equal to the total length between the blade root section 20 and the blade tip section 22. As shown in FIGS. 2 and 6, the rotor blade 16 also defines a chord 25 that is equal to the total length between a leading edge 24 of the rotor blade 16 and a trailing edge 26 of the rotor blade 16. As is generally understood, the chord 25 may generally vary in length with respect to the span 23 as the rotor blade 16 extends from the blade root section 20 to the blade tip section 22.

Figure 4:
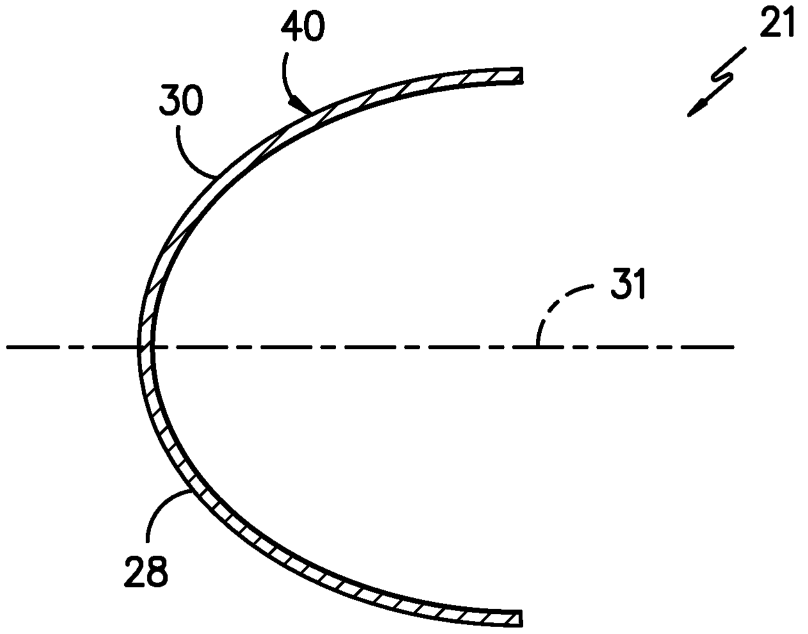
FIG. 4 illustrates a cross-sectional view of one embodiment of a leading edge segment of a modular rotor blade according to the present disclosure.

Referring particularly to FIGS. 2-4, any number of blade segments 21 or panels (also referred to herein as blade shells) having any suitable size and/or shape may be generally arranged between the blade root section 20 and the blade tip section 22 along a longitudinal axis 27 in a generally span-wise direction. Thus, the blade segments 21 generally serve as the outer casing/covering of the rotor blade 16 and may define a substantially aerodynamic profile, such as by defining a symmetrical or cambered airfoil-shaped cross-section.

In additional embodiments, it should be understood that the blade segment portion of the blade 16 may include any combination of the segments described herein and are not limited to the embodiment as depicted. More specifically, in certain embodiments, the blade segments 21 may include any one of or combination of the following: pressure and/or suction side segments 44, 46, (FIGS. 2 and 3), leading and/or trailing edge segments 40, 42 (FIGS. 2-6), a non-jointed segment, a single-jointed segment, a multi-jointed blade segment, a J-shaped blade segment, or similar.

Figure 5:
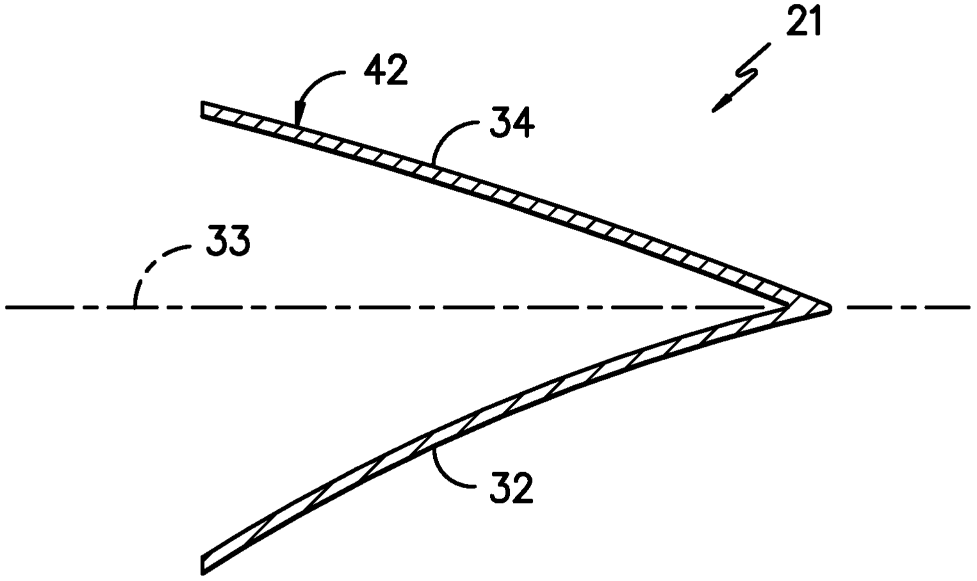
FIG. 5 illustrates a cross-sectional view of one embodiment of a trailing edge segment of a modular rotor blade according to the present disclosure.

More specifically, as shown in FIG. 4, the leading edge segments 40 may have a forward pressure side surface 28 and a forward suction side surface 30. Similarly, as shown in FIG. 5, each of the trailing edge segments 42 may have an aft pressure side surface 32 and an aft suction side surface 34. Thus, the forward pressure side surface 28 of the leading edge segment 40 and the aft pressure side surface 32 of the trailing edge segment 42 generally define a pressure side surface of the rotor blade 16. Similarly, the forward suction side surface 30 of the leading edge segment 40 and the aft suction side surface 34 of the trailing edge segment 42 generally define a suction side surface of the rotor blade 16. In addition, as particularly shown in FIG. 6, the leading edge segment(s) 40 and the trailing edge segment(s) 42 may be joined at a pressure side seam 36 and a suction side seam 38. For example, the blade segments 40, 42 may be configured to overlap at the pressure side seam 36 and/or the suction side seam 38. Further, as shown in FIG. 2, adjacent blade segments 21 may be configured to overlap at a seam 54. Alternatively, in certain embodiments, the various segments of the rotor blade 16 may be secured together via an adhesive (or mechanical fasteners) configured between the overlapping leading and trailing edge segments 40, 42 and/or the overlapping adjacent leading or trailing edge segments 40, 42.

In specific embodiments, as shown in FIGS. 2-3 and 6-7, the blade root section 20 may include one or more longitudinally extending spar caps 48, 50 infused therewith. For example, the blade root section 20 may be configured according to U.S. application Ser. No. 14/753,155 filed Jun. 29, 2015, entitled "Blade Root Section for a Modular Rotor Blade and Method of Manufacturing Same" which is incorporated herein by reference in its entirety.

Similarly, the blade tip section 22 may include one or more longitudinally extending spar caps 51, 53 infused therewith. More specifically, as shown, the spar caps 48, 50, 51, 53 may be configured to be engaged against opposing inner surfaces of the blade segments 21 of the rotor blade 16. Further, the blade root spar caps 48, 50 may be configured to align with the blade tip spar caps 51, 53. Thus, the spar caps 48, 50, 51, 53 may generally be designed to control the bending stresses and/or other loads acting on the rotor blade 16 in a generally span-wise direction (a direction parallel to the span 23 of the rotor blade 16) during operation of a wind turbine 10. In addition, the spar caps 48, 50, 51, 53 may be designed to withstand the span-wise compression occurring during operation of the wind turbine 10. Further, the spar cap(s) 48, 50, 51, 53 may be configured to extend from the blade root section 20 to the blade tip section 22 or a portion thereof. Thus, in certain embodiments, the blade root section 20 and the blade tip section 22 may be joined together via their respective spar caps 48, 50, 51, 53.

Figure 7:
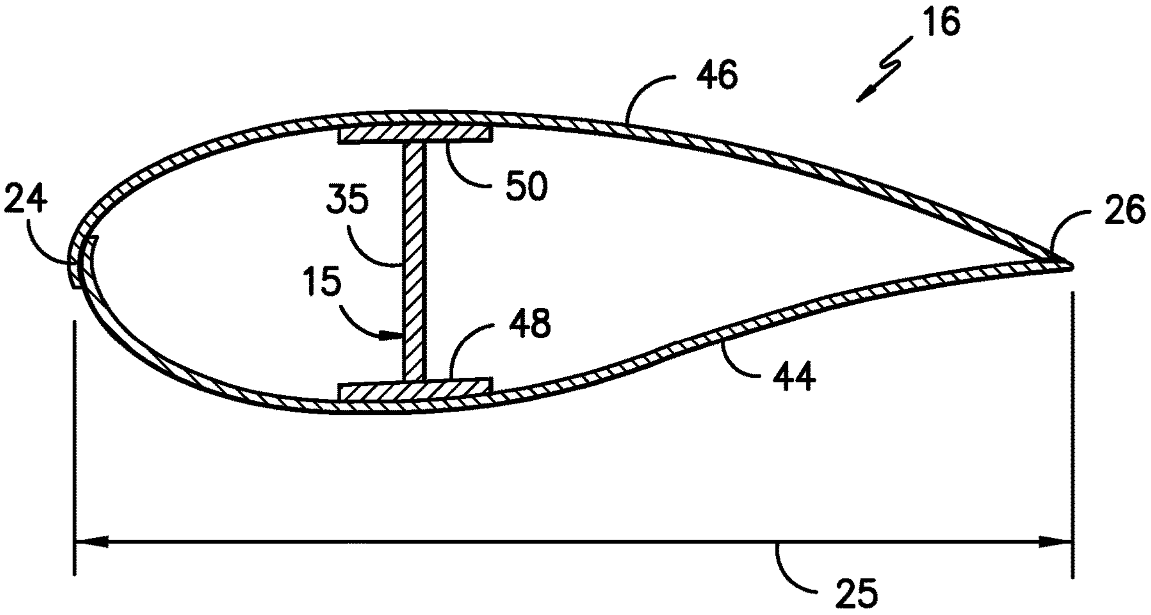
FIG. 7 illustrates a cross-sectional view of the modular rotor blade of FIG. 2 according to the present disclosure.

Referring to FIGS. 6-7, one or more shear webs 35 may be configured between the one or more spar caps 48, 50, 51, 53. More particularly, the shear web(s) 35 may be configured to increase the rigidity in the blade root section 20 and/or the blade tip section 22. Further, the shear web(s) 35 may be configured to close out the blade root section 20.

In addition, as shown in FIGS. 2 and 3, the additional structural component 52 may be secured to the blade root section 20 and extend in a generally span-wise direction so as to provide further support to the rotor blade 16. For example, the structural component 52 may be configured according to U.S. application Ser. No. 14/753,150 filed Jun. 29, 2015, entitled "Structural Component for a Modular Rotor Blade" which is incorporated herein by reference in its entirety. More specifically, the structural component 52 may extend any suitable distance between the blade root section 20 and the blade tip section 22. Thus, the structural component 52 is configured to provide additional structural support for the rotor blade 16 as well as an optional mounting structure for the various blade segments 21 as described herein. For example, in certain embodiments, the structural component 52 may be secured to the blade root section 20 and may extend a predetermined span-wise distance such that the leading and/or trailing edge segments 40, 42 can be mounted thereto.

Figure 8A:
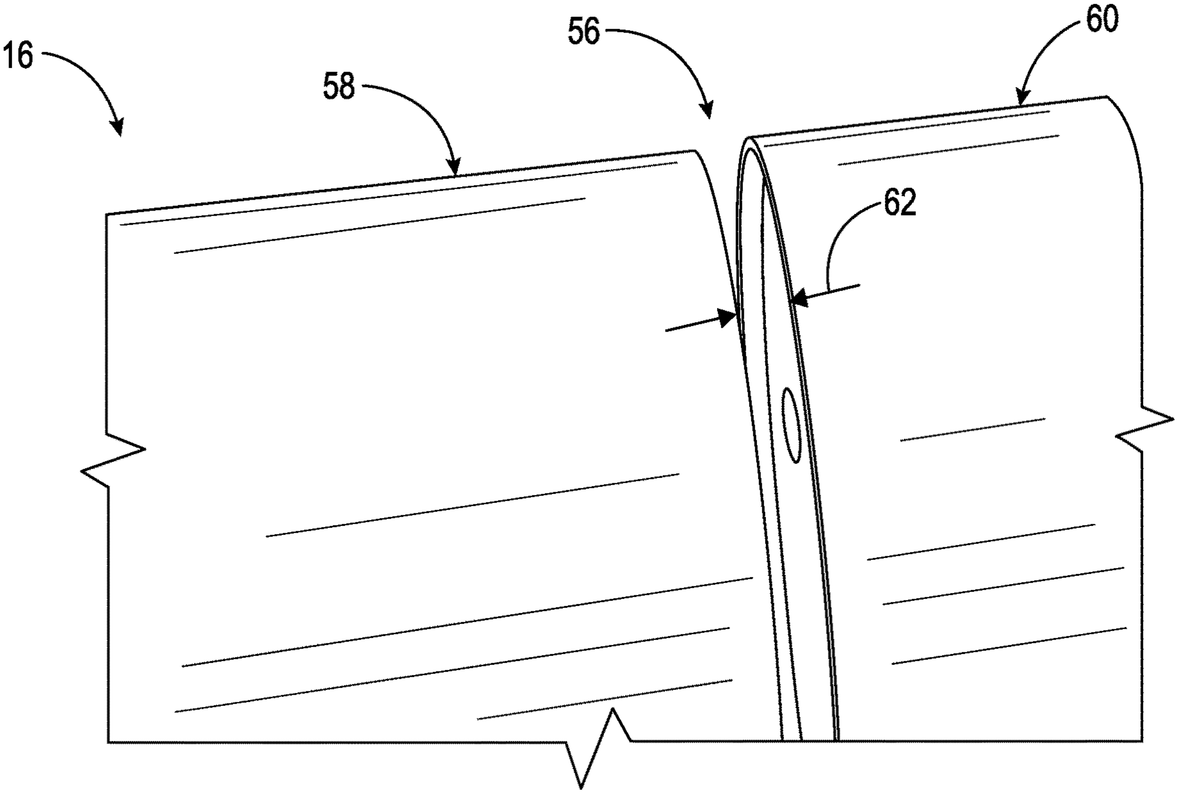
FIG. 8A illustrates a perspective view of an interface between blade components of a modular rotor blade according to the present disclosure, particularly illustrating a gap between the blade components.
Figure 8B:
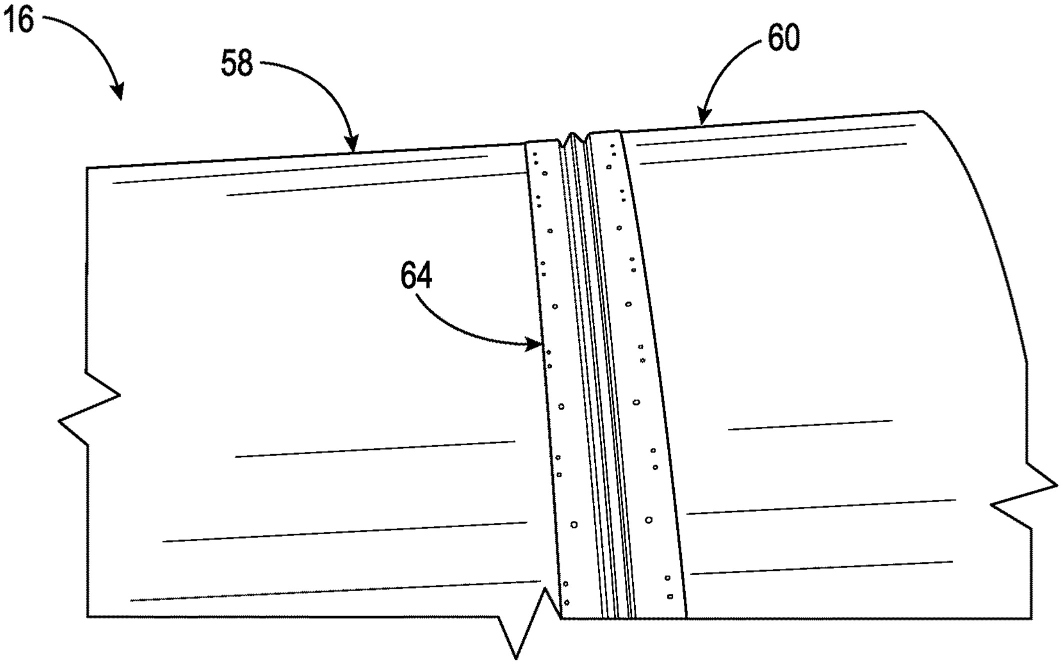
FIG. 8B illustrates a perspective view of an interface between blade components of a modular rotor blade according to the present disclosure, particularly illustrating a seal member covering the gap between the blade components.

Referring now to FIGS. 8A and 8B, perspective views of an interface 56 between first and second blade components 58, 60 of a modular rotor blade 16 according to the present disclosure are illustrated. For example, in an embodiment, the first and second blade components 58, 60 of the rotor blade 16 may be at least one of a rotor blade shell, a spar cap, a leading edge, a trailing edge, or combinations thereof. In such embodiments, the rotor blade shell may include a pressure side shell, a suction side shell, a blade root shell, or a blade tip shell. In the illustrated embodiment, for example, the first and second blade components 58, 60 may be first and second blade shells. Furthermore, as shown in FIG. 8A, the interface 56 between the blade components 58, 60 includes a gap 62. Thus, as shown in FIG. 8B, the gap 62 between the blade components 58, 60 is covered via a flexible sealing member 64.

In particular embodiments, as shown in FIGS. 8B-9B and 13-15B, the flexible sealing member 64 may include one or more bellows 65 for providing flexibility thereto such that the flexible sealing member 64 allows for movement between the first and second blade components 58, 60.

Figure 9A:
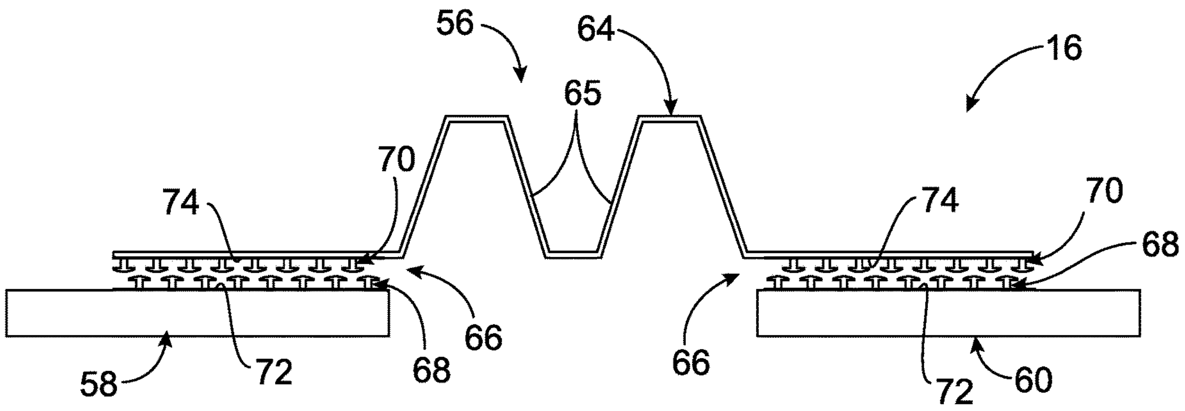
FIG. 9A illustrates a simplified, side view of one embodiment of an interface of first and second blade components of a rotor blade assembly according to the present disclosure, particularly illustrating a re-closeable fastening assembly arranged at the interface in a detached position.
Figure 9B:
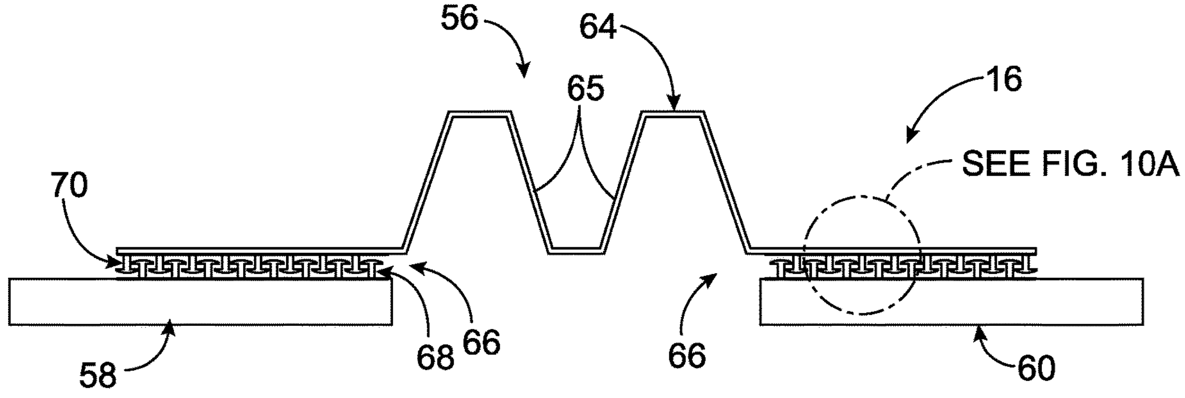
FIG. 9B illustrates a simplified, side view of the interface of the first and second blade components of the rotor blade assembly of FIG. 9A, particularly illustrating the re-closeable fastening assembly arranged at the interface in an attached position.

Referring now to FIGS. 9A and 9B, simplified, side views of one embodiment of the interface 56 of first and second blade components 58, 60 of the rotor blade assembly according to the present disclosure is illustrated. In particular, FIG. 9A illustrates a re-closeable fastening assembly 66 arranged at the interface 56 in a detached position: whereas FIG. 9B illustrates the re-closeable fastening assembly 66 arranged at the interface 56 in an attached position. Moreover, as shown in the illustrated embodiment, the re-closeable fastening assembly includes, at least, a first fastening member 68 and a corresponding, second fastening member 70. In particular, as shown, the first fastening member 68 is arranged with a surface 72 of at least one of the first blade component 58 or the second blade component 60. In addition, as shown, the second fastening member 70 is arranged with a surface 74 of the flexible sealing member 64 such that the second fastening member 70 aligns with the first fastening member 68 on the surface 72 of at least one of the first blade component 68 or the second blade component 70. Thus, the flexible sealing member 64 is secured (either temporarily or permanently) at the interface 56 to each of the first and second blade components 58, 60 via the first and second fastening members 68, 70. Further, as shown in FIG. 10A, a detailed, side view of one embodiment of the re-closeable fastening assembly 66 of FIG. 9B in the attached position according to the present disclosure is illustrated.

In further embodiments, the first and second fastening members 68, 70 of the re-closeable fastening assembly 66 may include at least one of hook-and-loop fasteners, snap-fit fasteners, interlocking fasteners, zipper fasteners, or combinations thereof.

For example, in an embodiment, as shown in FIGS. 9A-9B and 10A-10B, the first and second fastening members 68, 70 may be the interlocking fasteners. In such embodiments, as shown, the interlocking fasteners may include at least one of mushroom-shaped fasteners or dovetail-shaped fasteners that can be brought together and secured via, e.g., a snap fit.

Figure 10A:
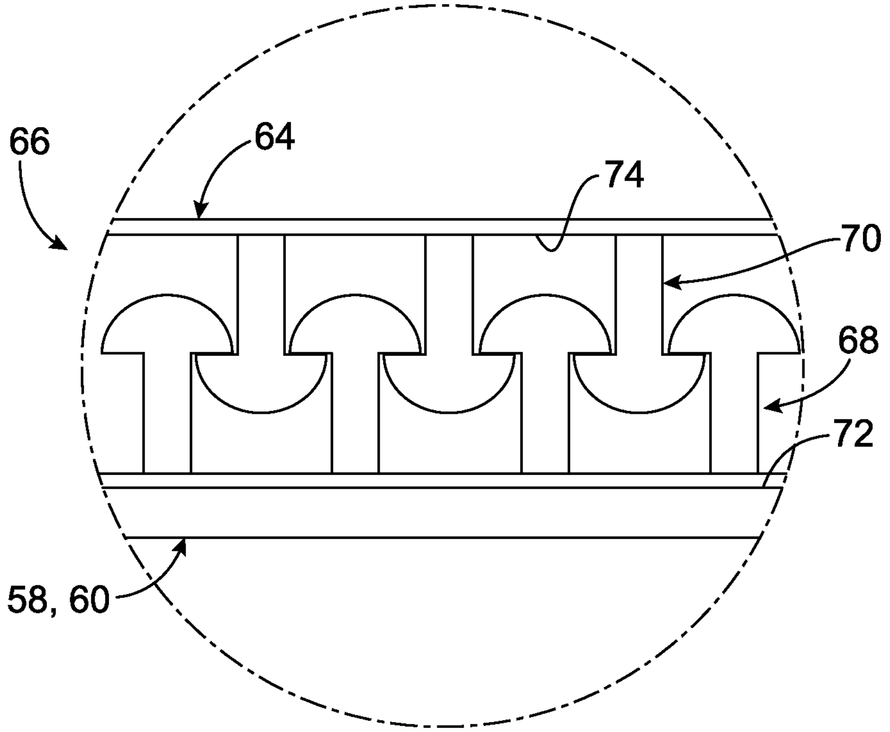
FIG. 10A illustrates a detailed, side view of one embodiment of a re-closeable fastening assembly in an attached position according to the present disclosure, particularly illustrating fastening members of the fastening assembly having a rigid configuration.
Figure 10B:
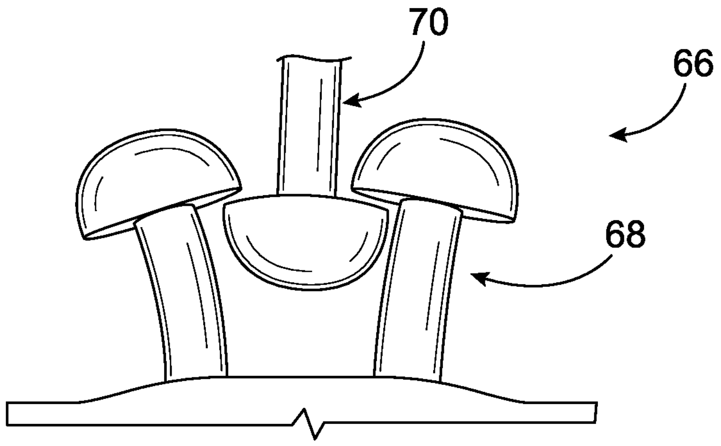
FIG. 10B illustrates a detailed, side view of another embodiment of a re-closeable fastening assembly in an attached position according to the present disclosure, particularly illustrating fastening members of the fastening assembly having a flexible configuration.

Furthermore, as shown in FIGS. 10A and 10B, the first and second fastening members 68, 70 of the re-closeable fastening assembly 66 may have a rigid configuration (FIG. 10A) or a flexible configuration (FIG. 10B). Thus, as shown in FIG. 10B, the individual fastening members 68, 70 of the re-closeable fastening assembly 66 are configured to flex and bend to accommodate securement to adjacent fastening members.

Figure 11A:
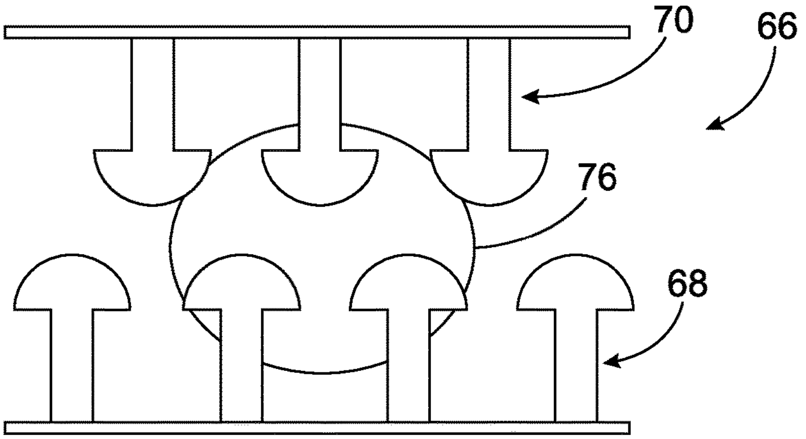
FIG. 11A illustrates a detailed, side view of one embodiment of a re-closeable fastening assembly in a detached position according to the present disclosure, particularly illustrating an elastomer matrix provided between fastening members of the fastening assembly.
Figure 11B:
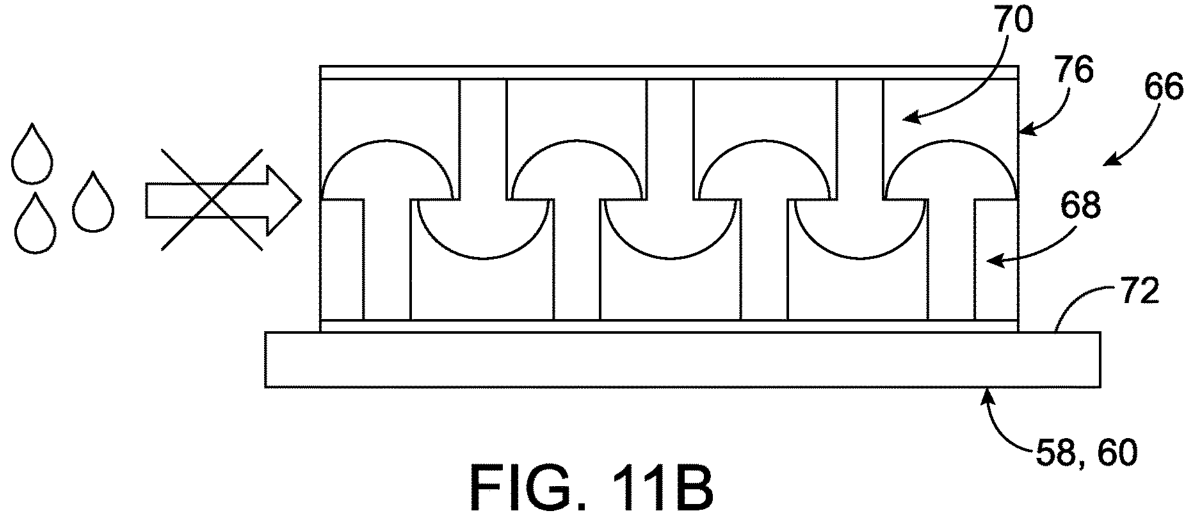
FIG. 11B illustrates a detailed, side view of the re-closeable fastening assembly in an attached position according to the present disclosure, particularly illustrating the elastomer matrix securing the fastening members of the fastening assembly together and preventing water ingress.

Referring now to FIGS. 11A and 11B, in certain embodiments, the first and second fastening members 68, 70 of the re-closeable fastening assembly 66 may further include an elastomer matrix 76 therebetween or adjacent to one of the first and second fastening members 68, 70 for further securing the first and second fastening members 68, 70 together, improving peel strength, and/or preventing fluid/water ingress. The elastomer matrix 76, for example, may include ad adhesive or a sealant.

Figure 12:
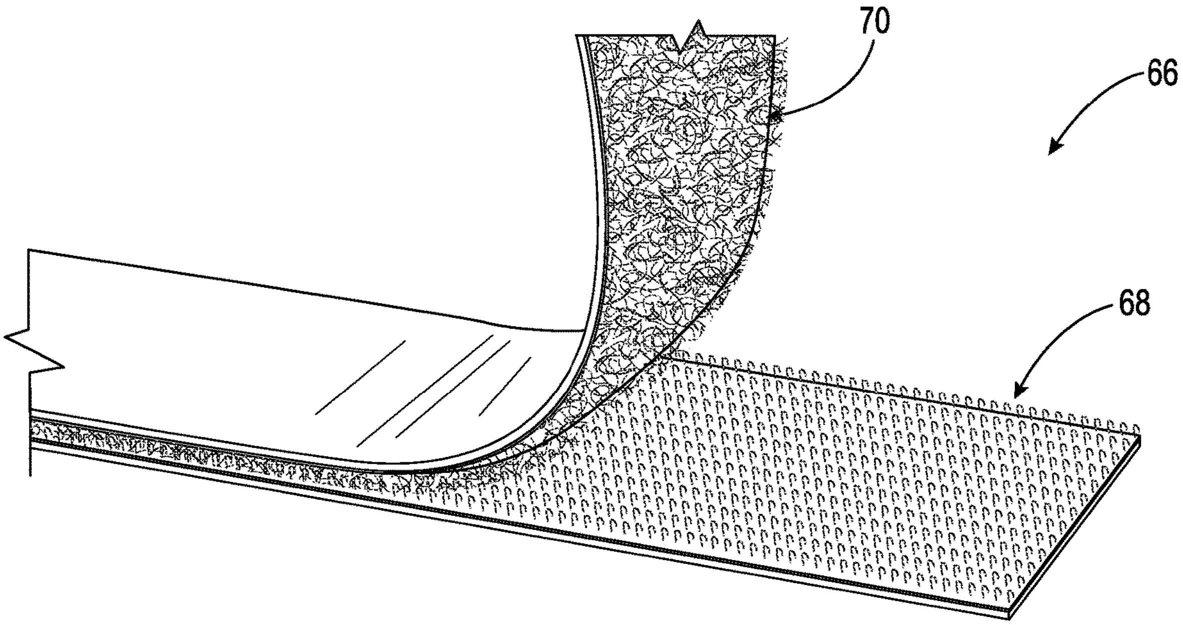
FIG. 12 illustrates a perspective view of another embodiment of a re-closeable fastening assembly having a hook-and-loop configuration according to the present disclosure.

In another embodiment, as shown in FIG. 12, the first and second fastening members 68, 70 of the re-closeable fastening assembly 66 may be the hook-and-loop fasteners 78. In such embodiments, the first fastening member 68 may be a first hook-and-loop fastening member and the second fastening member may be a second hook-and-loop fastening member 70, with the first and second hook-and-loop fastening members being secured to exterior surfaces of at least one of the first blade component or the second blade component and a flange or surface 74 of the flexible sealing member.

Figure 13:
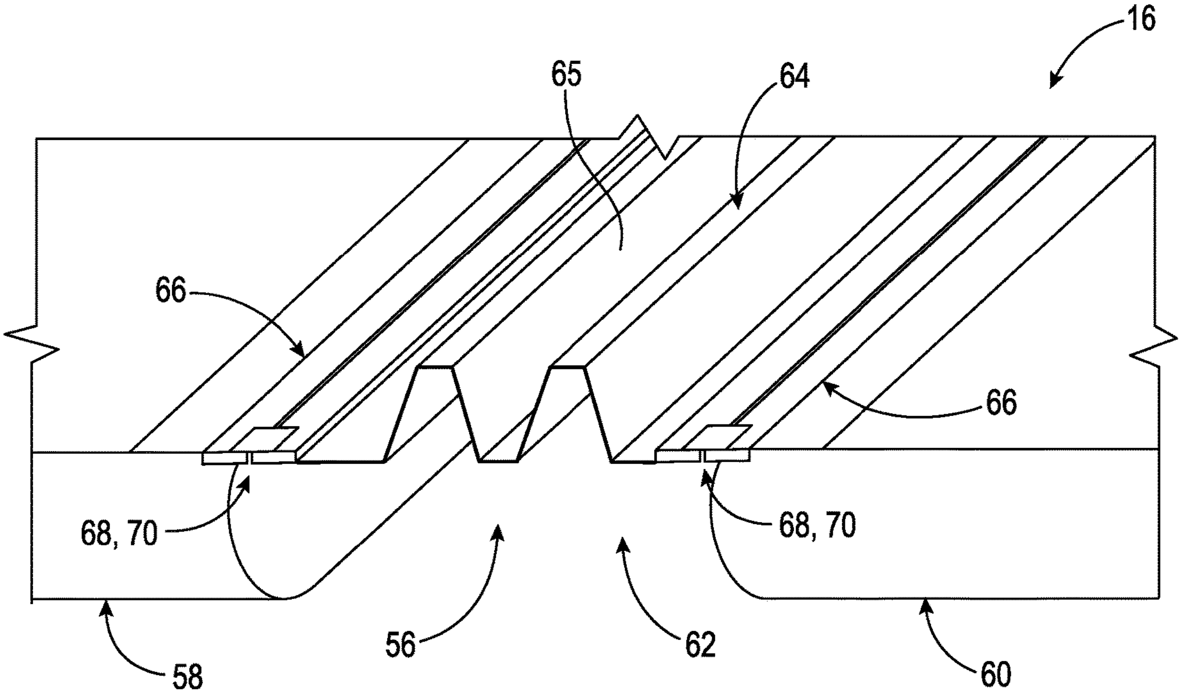
FIG. 13 illustrates a perspective view of another embodiment of an interface of first and second blade components of a rotor blade assembly according to the present disclosure, particularly illustrating a re-closeable fastening assembly having a zipper configuration arranged at the interface.
Figure 14A:
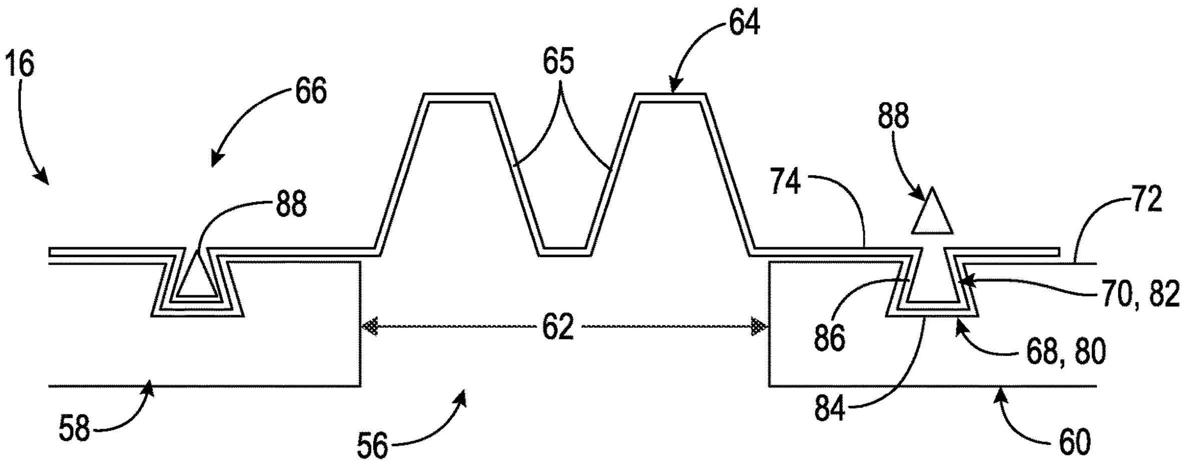
FIG. 14A illustrates a simplified, side view of one embodiment of an interface of first and second blade components of a rotor blade assembly according to the present disclosure, particularly illustrating a re-closeable fastening assembly arranged at the interface and having a zipper configuration.
Figure 14B:
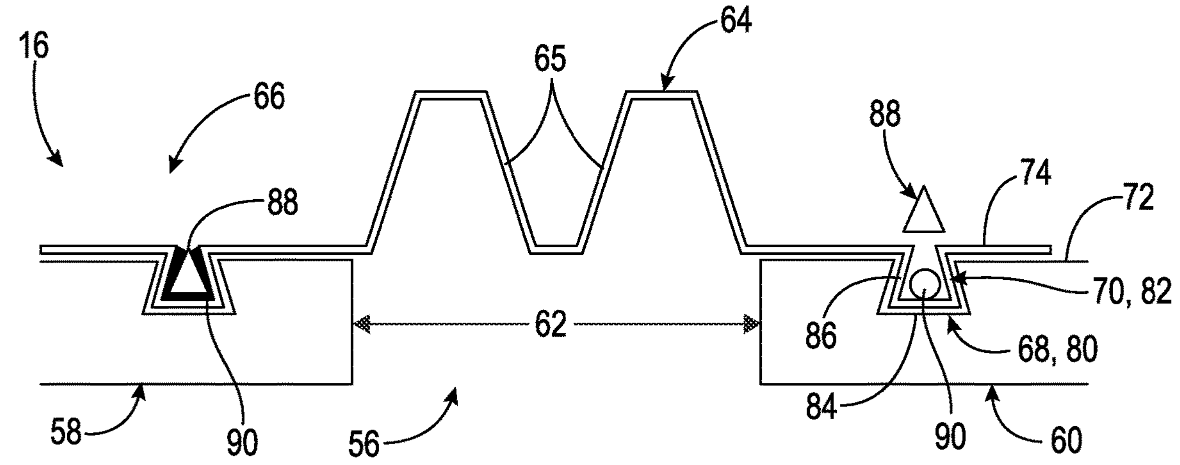
FIG. 14B illustrates a simplified, side view of the interface of the first and second blade components of the rotor blade assembly of FIG. 14A, particularly illustrating the re-closeable fastening assembly having the zipper configuration further secured at the interface via an adhesive.

Referring now to FIGS. 13, 14A, and 14B, the first and second fastening members 68, 70 of the re-closeable fastening assembly 66 may be the zipper fasteners. In such embodiments, the first fastening member 68 may be a first zipper fastening member 80 and the second fastening member 70 may be a second zipper fastening member 82. More particularly, in an embodiment, as shown particularly in FIGS. 14A and 14B, the first zipper fastening member 80 may be a groove 84 or recess formed into the surface 72 of at least one of the first blade component 58 or the second blade component 60 and the second zipper fastening member 82 may be a corresponding protrusion 86 formed into the flange or surface 74 of the flexible sealing member 64. Thus, as shown, the second zipper fastening member 82 fits into the first zipper fastening member 80. In addition, as shown, the re-closeable fastening assembly 66 may include an insert member 88 inserted into the groove 84 atop the second zipper fastening member 82 to secure the first and second zipper fastening members 80, 82 in place, similar to a zipper.

Referring particularly to FIG. 14B, the first and second fastening members 68, 70 of the re-closeable fastening assembly 66 may also include an elastomer matrix 90 or an adhesive between the insert member 88 and the second zipper fastening member 82 to increase peel strength.

Figure 15A:
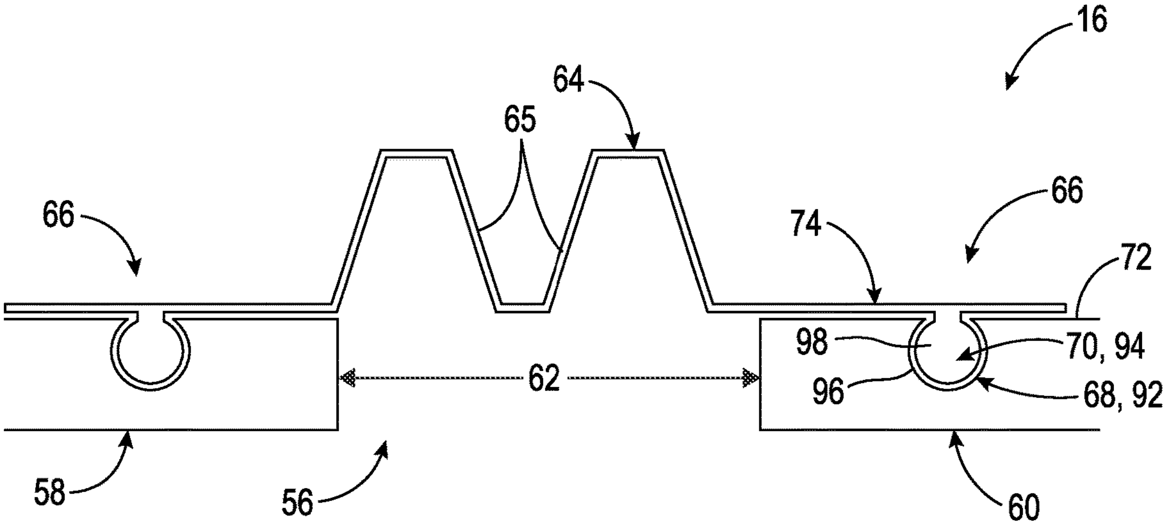
FIG. 15A illustrates a simplified, side view of one embodiment of an interface of first and second blade components of a rotor blade assembly according to the present disclosure, particularly illustrating a re-closeable fastening assembly arranged at the interface and having a snap-fit configuration.
Figure 15B:
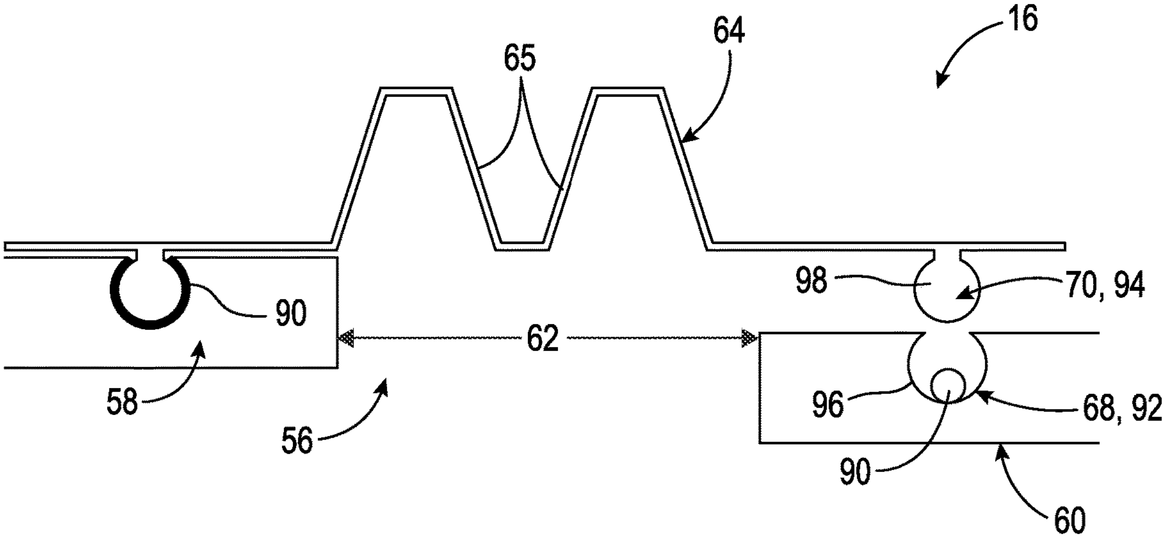
FIG. 15B illustrates a simplified, side view of the interface of the first and second blade components of the rotor blade assembly of FIG. 15A, particularly illustrating the re-closeable fastening assembly having the snap-fit configuration further secured at the interface via an adhesive.

Referring now to FIGS. 15A and 15B, in another embodiment, the first and second fastening members 68, 70 of the re-closeable fastening assembly 66 may be the snap-fit fasteners. In such embodiments, the first fastening member 68 may be a first snap-fit fastening member 92 and the second fastening member 70 may be a second snap-fit fastening member 94. In such embodiments, as shown, the first snap-fit fastening member 92 is a groove 96 formed into the surface 72 of at least one of the first blade component 58 or the second blade component 70, and the second snap-fit fastening member 94 is a corresponding protrusion 98 formed into the flange or surface 74 of the flexible sealing member 64. Thus, in such embodiments, the second snap-fit fastening member 94 snap fits into the first snap-fit fastening member 92.

Referring particularly to FIG. 15B, in particular embodiments, the re-closeable fastening assembly 66 may also include the elastomer matrix 90 arranged between the first and second fastening members 68, 70 to increase peel strength.

Figure 16:
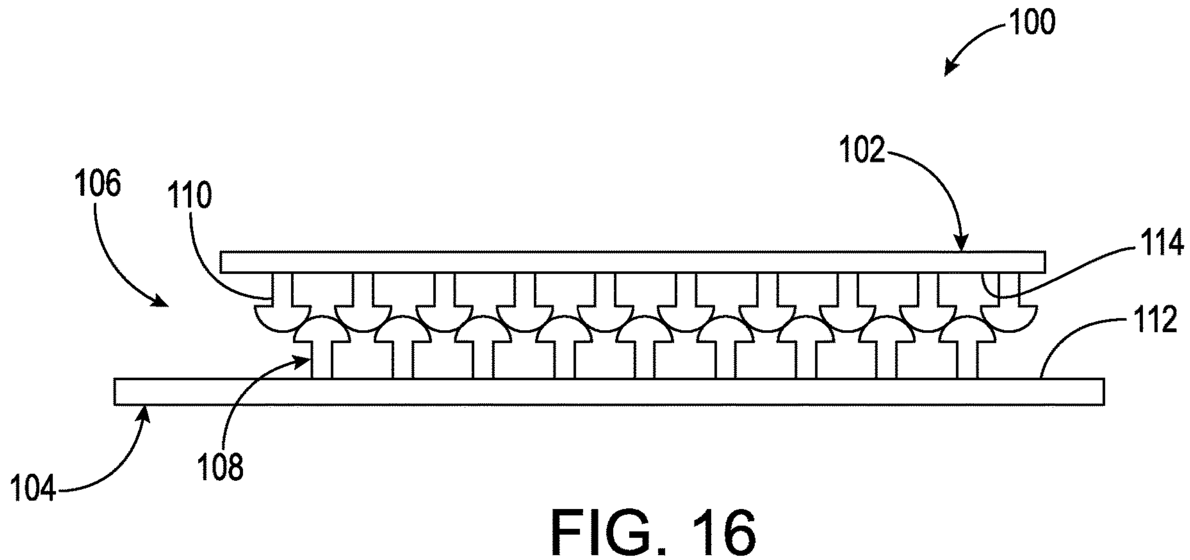
FIG. 16 illustrates a side view of an embodiment of a rotor blade assembly having first and second blade components joined via a re-closeable fastening assembly according to the present disclosure.

Referring now to FIG. 16, in further embodiments, it should be understood that the present disclosure is further directed to a rotor blade assembly 100 having one or more add-on components 102 secured to the rotor blade using the various fastening members described herein. Such add-on components 102 may include, for example, access panels, serrations, vortex generators, spoilers, inspection doors, seals (as described above), sensors, flaps, etc. Furthermore, as shown in FIG. 16, the rotor blade assembly 100 may include a first blade component 104, a re-closeable fastening assembly 106 having, at least, a first fastening member 108 and a corresponding, second fastening member 110. Further, as shown, the first fastening member 108 is arranged with a surface 112 of the first blade component 104. Moreover, as shown, the add-on component 102 is arranged adjacent to the first fastening member 108, with the second fastening member 110 being arranged with a surface 114 of the add-on component 102 such that the second fastening member 110 aligns with the first fastening member 108 on the surface 112 of the first blade component 104. Thus, the add-on component 102 is secured to the first blade component via the first and second fastening members 108, 110.

Figure 17:
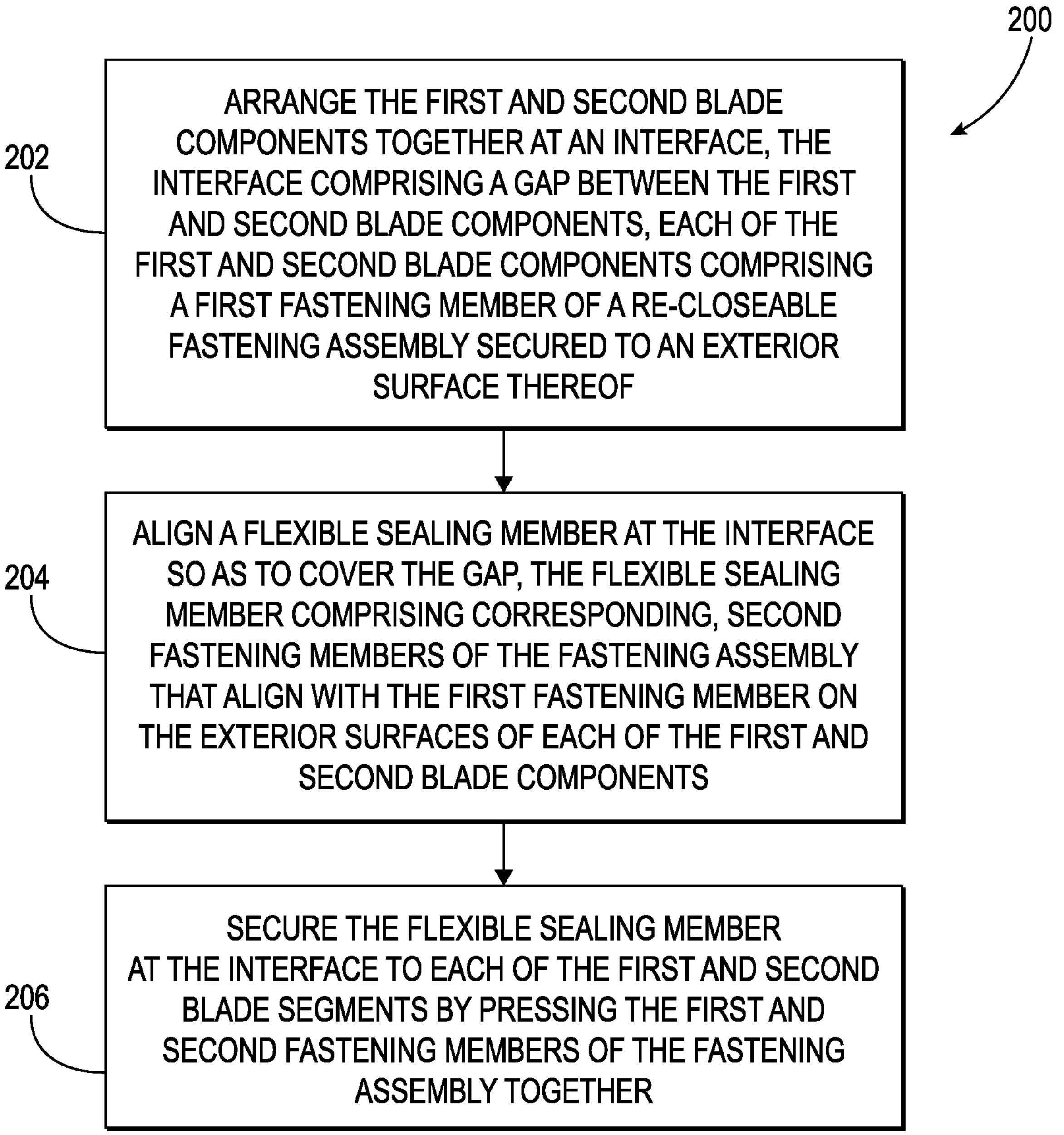
FIG. 17 illustrates a flow diagram of one embodiment of a method of joining first and second blade components of a rotor blade of a wind turbine according to the present disclosure.

Referring now to FIG. 17, a flow diagram of one embodiment of method 200 of joining the first and second blade components 58, 60 of the rotor blade 16 is illustrated. In general, the method 200 is described herein as implemented for joining the rotor blade components described above. However, it should be appreciated that the disclosed method 200 may be used to assemble any other rotor blade components as well. For example, in certain embodiments, the blade components described herein may include, for example, a rotor blade shell (a pressure side shell, a suction side shell, a trailing edge segment, a leading edge segment, etc.), a spar cap, a leading edge bond cap, or combinations thereof, as well as any other rotor blade component.

In addition, although FIG. 17 depicts steps performed in a particular order for purposes of illustration and discussion, the methods described herein are not limited to any particular order or arrangement. One skilled in the art, using the disclosures provided herein, will appreciate that various steps of the methods can be omitted, rearranged, combined and/or adapted in various ways.

As shown at (202), the method 200 includes arranging the first and second blade components together at an interface. The interface includes a gap between the first and second blade components, with each of the first and second blade components including a first fastening member of a re-closeable fastening assembly secured to an exterior surface thereof. As shown at (204), the method 200 includes aligning a flexible sealing member at the interface so as to cover the gap. The flexible sealing member includes corresponding, second fastening members of the fastening assembly that align with the first fastening member on the exterior surfaces of each of the first and second blade components. As shown at (206), the method 200 includes securing the flexible sealing member at the interface to each of the first and second blade components by pressing the first and second fastening members of the fastening assembly together.

The skilled artisan will recognize the interchangeability of various features from different embodiments. Similarly, the various method steps and features described, as well as other known equivalents for each such methods and feature, can be mixed and matched by one of ordinary skill in this art to construct additional systems and techniques in accordance with principles of this disclosure. Of course, it is to be understood that not necessarily all such objects or advantages described above may be achieved in accordance with any particular embodiment. Thus, for example, those skilled in the art will recognize that the systems and techniques described herein may be embodied or carried out in a manner that achieves or optimizes one advantage or group of advantages as taught herein without necessarily achieving other objects or advantages as may be taught or suggested herein.

While only certain features of the invention have been illustrated and described herein, many modifications and changes will occur to those skilled in the art. It is, therefore, to be understood that the appended claims are intended to cover all such modifications and changes as fall within the true spirit of the invention.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A rotor blade assembly of a wind turbine, the rotor blade assembly comprising:

a first blade component;

a second blade component arranged with the first blade component at an interface, the interface comprising a gap between the first and second blade components;

a re-closeable fastening assembly comprising, at least, a first fastening member and a corresponding, second fastening member, the first fastening member arranged with a surface of at least one of the first blade component or the second blade component;

a flexible sealing member arranged at the interface so as to cover the gap, the second fastening member being arranged with a surface of the flexible sealing member such that the second fastening member aligns with the first fastening member on the surface of at least one of the first blade component or the second blade component, wherein the flexible sealing member is secured at the interface to each of the first and second blade components via the first and second fastening members, wherein the first fastening member is a first zipper fastening member and the second fastening member is a second zipper fastening member, the first zipper fastening member being a groove formed into the surface of at least one of the first blade component or the second blade component, the second zipper fastening member being a corresponding protrusion formed into a flange of the flexible sealing member, the second zipper fastening member fitting into the first zipper fastening member.

2. The rotor blade assembly of claim 1, wherein the first and second blade components of the rotor blade comprise at least one of a rotor blade shell, a spar cap, a leading edge, a trailing edge, or combinations thereof, the rotor blade shell comprising at least one of a pressure side shell or a suction side shell.

3. The rotor blade assembly of claim 1, further comprising an insert member inserted into the groove atop the second zipper fastening member to secure the first and second zipper fastening members in place.

4. The rotor blade assembly of claim 3, further comprising an elastomer matrix between the insert member and the second zipper fastening member to increase peel strength.

5. The rotor blade assembly of claim 1, further comprising an elastomer matrix provided between the first and second fastening members or adjacent to one of the first and second fastening members for further securing the first and second fastening members together, improving peel strength, and/or preventing fluid ingress.

6. The rotor blade assembly of claim 1, wherein the flexible sealing member comprises one or more bellows for providing flexibility such that the flexible sealing member allows for movement between the first and second blade components.

7. A method of joining first and second blade components of a rotor blade of a wind turbine, the method comprising:

arranging the first and second blade components together at an interface, the interface comprising a gap between the first and second blade components, each of the first and second blade components comprising a first fastening member of a re-closeable fastening assembly secured to an exterior surface thereof, the first fastening members being first zipper fastening members each having a groove formed into the surface of at least one of the first blade component or the second blade component;

aligning a flexible sealing member at the interface so as to cover the gap, the flexible sealing member comprising corresponding, second fastening members of the re-closeable fastening assembly that align with the first fastening members on the exterior surfaces of each of the first and second blade components, the second fastening members being second zipper fastening members, the second zipper fastening members being corresponding protrusions formed into a flange of the flexible sealing member, the second zipper fastening members fitting into the first zipper fastening members; and securing the flexible sealing member at the interface to each of the first and second blade components by pressing the first and second fastening members of the fastening assembly together.

8. The method of claim 7, further comprising:

removing the flexible sealing member by detaching the second fastening member of the re-closeable fastening assembly from the first fastening member for inspection or repair; and reattaching the second fastening member to the first fastening member after the inspection or the repair is complete.

9. A rotor blade assembly of a wind turbine, the rotor blade assembly comprising:

a first blade component;

a re-closeable fastening assembly comprising, at least, a first fastening member and a corresponding, second fastening member, the first fastening member arranged with a surface of the first blade component, wherein the first fastening member is a first zipper fastening member and the second fastening member is a second zipper fastening member, the first zipper fastening member being a groove formed into the surface of the first blade component;

an add-on component arranged adjacent to the first fastening member, the second fastening member being arranged with a surface of the add-on component such that the second fastening member aligns with the first fastening member on the surface of the first blade component, the second zipper fastening member being a corresponding protrusion formed into a flange of the add-on component, the second zipper fastening member fitting into the first zipper fastening member, wherein the add-on component is secured to the first blade component via the first and second fastening members.

10. The rotor blade assembly of claim 9, wherein the first blade component of the rotor blade comprises at least one of a rotor blade shell, a spar cap, a leading edge, a trailing edge, or combinations thereof, the rotor blade shell comprising at least one of a pressure side shell or a suction side shell.

11. The rotor blade assembly of claim 9, further comprising an elastomer matrix provided between the first and second fastening members or adjacent to one of the first and second fastening members for further securing the first and second fastening members together, improving peel strength, and/or preventing fluid ingress.

* * * * *